United States Patent [19]

Seymour

[11] 4,280,828
[45] Jul. 28, 1981

[54] SHAPING GLASS SHEETS BY DROP FORMING WITH PRESSURE ASSIST

[75] Inventor: Samuel L. Seymour, Oakmont, Pa.

[73] Assignee: PPG Industries, Inc., Pittsburgh, Pa.

[21] Appl. No.: 25,423

[22] Filed: Mar. 30, 1979

Related U.S. Application Data

[63] Continuation-in-part of Ser. No. 960,404, Nov. 13, 1978, abandoned.

[51] Int. Cl.² ........................................... C03B 23/025
[52] U.S. Cl. ........................................ 65/106; 65/104; 65/273
[58] Field of Search ............... 65/104, 106, 107, 268, 65/273, 114

[56] References Cited

U.S. PATENT DOCUMENTS

| | | | |
|---|---|---|---|
| 3,148,968 | 9/1964 | Cypher et al. | 65/106 |
| 3,181,563 | 5/1965 | Giffen | 65/106 X |
| 3,223,501 | 12/1965 | Fredley | 65/2 AA |
| 3,332,759 | 7/1967 | McMaster et al. | 65/25 A |
| 3,468,645 | 9/1969 | McMaster et al. | 65/107 X |
| 3,507,639 | 4/1970 | Seymour | 65/104 |
| 3,529,947 | 9/1970 | Frank | 65/104 |
| 3,573,889 | 4/1971 | McMaster et al. | 65/62 |
| 3,676,098 | 7/1972 | Hall | 65/106 |
| 3,701,643 | 10/1972 | Frank | 65/62 |
| 3,846,104 | 11/1974 | Seymour | 65/104 |
| 3,973,943 | 8/1976 | Seymour | 65/348 |
| 4,202,681 | 5/1980 | McMaster et al. | 65/273 X |
| 4,204,854 | 5/1980 | McMaster et al. | 65/273 X |

*Primary Examiner*—Arthur D. Kellogg
*Attorney, Agent, or Firm*—Dennis G. Millman

[57] ABSTRACT

Heat-softened glass sheets are shaped by being lifted by vacuum drawn through a platen and then dropped onto a shaping mold. The dropping of the glass sheets is assisted by rapidly replacing the vacuum in the platen with super-atmospheric pressure.

7 Claims, 5 Drawing Figures

SHAPING GLASS SHEETS BY DROP FORMING WITH PRESSURE ASSIST

CROSS REFERENCE TO RELATED APPLICATION

This application is a continuation-in-part of U.S. Application Ser. No. 960,404, filed Nov. 13, 1978 now abandoned.

BACKGROUND OF THE INVENTION

This invention relates to an improvement in the method and apparatus for bending sheets of glass disclosed in Application Ser. No. 960,404. In that application an arrangement is disclosed whereby heat-softened glass sheets are lifted by a flat vacuum platen and dropped onto a contoured bending mold so as to shape the glass sheet. Such a system reduces the number of elements which must be custom fabricated for each particular bent glass shape to be produced, thereby reducing the cost and downtime required for each product change. The drop forming technique of the earlier application is also advantageous in that it may readily be adapted to bending and tempering a plurality of glass sheets simultaneously, thereby greatly increasing the productivity of a production line.

While the drop forming method and apparatus of the earlier application are highly advantageous, additional improvements would be desirable. In some cases it may be desired to drop the glass sheets with greater force than provided by gravity in order to produce sharper bends. Also, it may be preferred to increase the speed of the process by accelerating the dropping of the glass sheets onto the shaping mold. A particular need for accelerating the release of the glass sheets from the vacuum platen may arise when the glass sheets tend to stick to the vacuum platen. This may occur, for example, when patterns of frit coating have been applied to the upper surfaces of the glass sheets. Another desirable improvement would be the capability of cooling the vacuum platen so as to maintain a controlled, substantially constant temperature in the bending station.

Applying air to press bending molds for the purpose of cooling has been practiced in the prior art as exemplified by U.S. Pat. No. 3,507,639 (S. L. Seymour) and U.S. Pat. No. 3,529,947 (R. G. Frank).

SUMMARY OF THE INVENTION

In the present invention each glass sheet to be bent after being heated to a softened condition is elevated by vacuum drawn through a flat, perforated platen which is brought into contact with the upper side of the glass sheet. When the platen and the glass sheet are raised to an elevated position, a shaping mold having a contour which defines the desired curvature for the bent glass sheet is conveyed into a position beneath the glass sheet. Then the negative pressure in the platen is quickly replaced by a super-atmosphere positive pressure so as to rapidly blow the glass sheet off of the platen onto the shaping mold to produce the desired bend. The shaping mold may then be retracted from beneath the platen and pass into a tempering station where blasts of air are directed onto the opposite surfaces of the glass sheet to temper the glass.

By switching from vacuum to positive pressure the glass sheet is dropped with greater force onto the shaping mold, thereby providing greater bending force when the glass impacts the shaping mold, which permits the production of sharper bends. The drop is also accelerated by the positive pressure upon release, thereby increasing the throughput rate of the bending apparatus. Also, by positively pressurizing the platen, any sticking of the glass sheet to the platen is avoided and a uniform release of the glass sheet from the platen is assured. Furthermore, when pressurized air is blown through the platen, cooling of the platen can be attained. Because the platen is in contact with heated glass sheets and, in at least the preferred embodiments, may overlie a heated support bed, cooling of the platen advantageously permits the temperature of the platen to be stabilized, thereby assuring a uniform, thermal environment for each glass sheet being processed. In order to obtain the amount of cooling desired, the pressurized flow of air through the platen may be continued for a period of time after each glass sheet has been released therefrom.

The apparatus for carrying out the invention may comprise a system of ducts and valves communicating the vacuum platen selectively to either the intake or output side of a blower. The valves are actuated by a switching means so as to reverse the flow to or from the platen without stopping the blower. In this manner, the flow can be reversed quickly without the delay entailed by stopping a blower.

THE DRAWINGS

DETAILED DESCRIPTION

Figure 1:
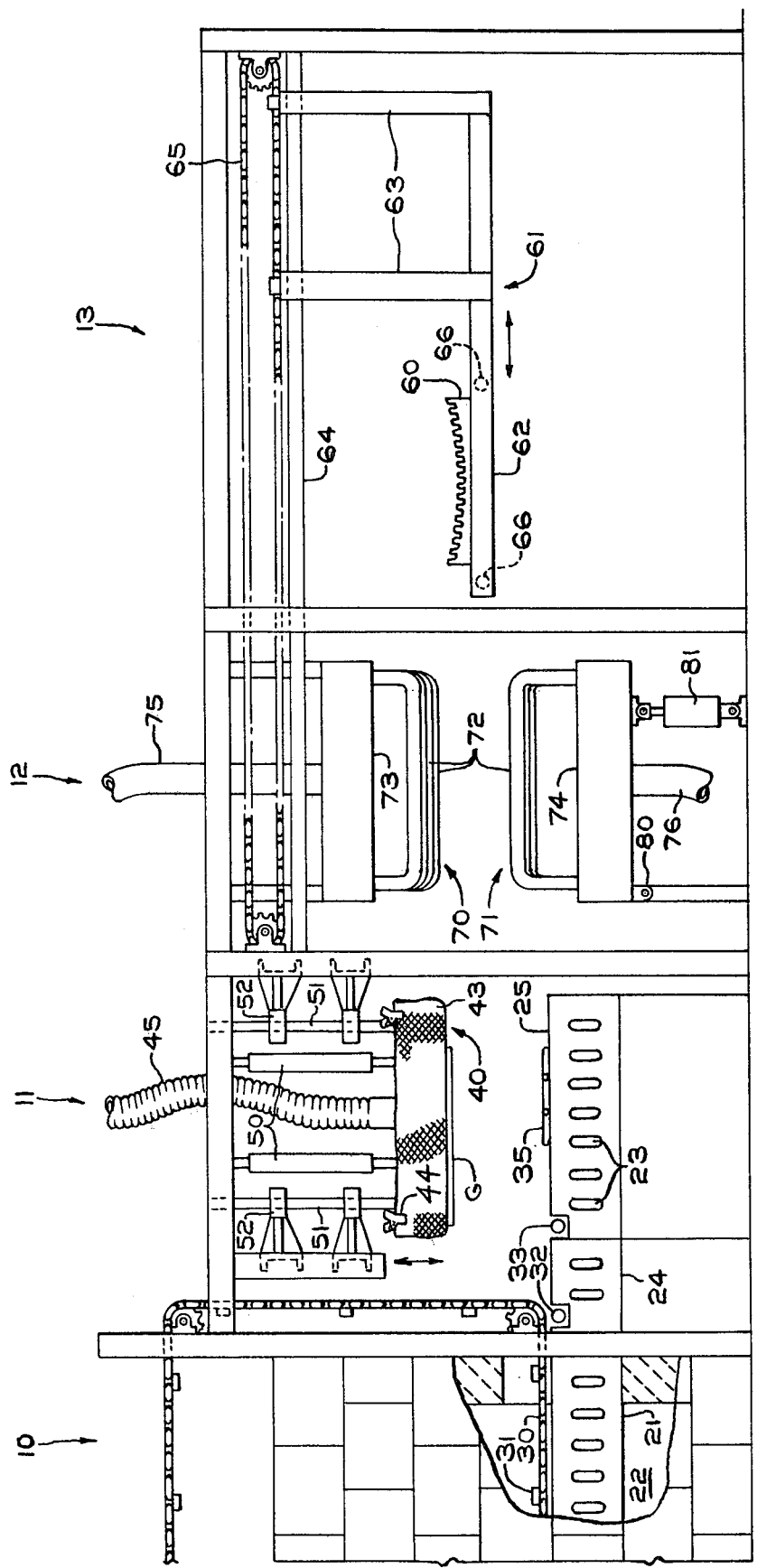
FIG. 1 is a side view of a specific preferred embodiment of a glass sheet bending and tempering installation incorporating the drop forming process and reversible pressure platen of the present invention.

In FIG. 1 there is shown a bending and tempering line including a furnace 10 (only the exit end of which is shown), a bending station 11, a tempering station 12, and an unloading station 13. The furnace, tempering station, and unloading station form no part of the present invention, and the description of a specific embodiment herein is for the purpose of illustration only. Any arrangement known in the art for heating and tempering a series of horizontally disposed glass sheets may be employed in connection with the bending process of the present invention. Accordingly, only a brief description of the furnace, tempering station and unloading station will be set forth here. Additional details regarding these aspects of the overall bending and tempering line may be obtained from U.S. Pat. No. 3,846,104 (Seymour), the disclosure of which is hereby incorporated by reference.

Furnace 10 is preferably of the gas support type wherein the sheets of glass are supported on a layer of hot gases as they are heated and conveyed through the furnace. Examples of gas support furnaces for heating glass sheets may be found in U.S. Pat. No. 3,233,501 to Fredley et al. and in U.S. Pat. No. 3,332,759 to McMaster et al. In the cut-away portion of the furnace in FIG. 1 it can be seen that the gas support bed is defined by a hearth block 21 through which a large number of vertical bores extend, some of which communicate the upper surface of the hearth block with hot, pressurized gases from a plenum chamber 22 and others of which communicate the top surface of the hearth block with cross-bored exhaust passages 23. The same hearth block construction continues beyond the furnace exit to an extension 24 and a support block 25 in the bending zone.

Referring again now in FIG. 1, there is shown one typical arrangement for propelling the glass sheets through the furnace as they are supported on a film of hot gases. The conveying mechanism there comprises a pair of parallel, endless chains 30 flanking the path of the glass sheets inside the furnace and joined by a plurality of pusher bars 31. At the exit of the furnace, each glass sheet may be released from the chain conveying means and driven at an accelerated speed across the extension block 24 and into the bending station by means of a take-out roll 32 and an aligning roll 33. Passage of the glass sheets from the furnace may be aided by providing the hearth blocks 21, 24, and 25 with a slight downward slope (e.g., 1 degree to 2 degrees). Typically, sufficient gas pressure is maintained between the hearth blocks and the glass sheets so as to float the glass sheets about 1/16 inch (1.6 millimeters) above the upper surface of the hearth blocks. Take-out roll 32 and aligning roll 33 project above the upper surface of the hearth blocks just enough to make contact with the undersides of the glass sheets.

Figure 3:
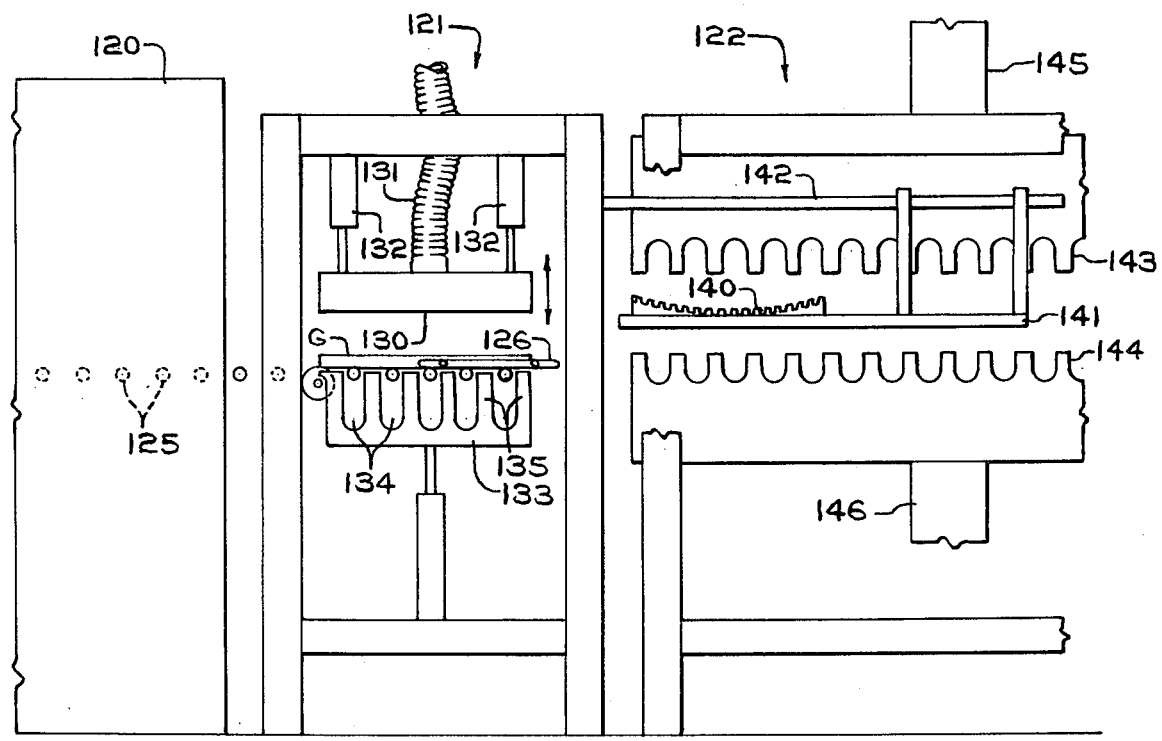
FIG. 3 is another alternate embodiment of a drop forming process for bending glass sheets wherein each glass sheet may be supported beneath a reversible pressure platen in the bending station on a roller conveyor.

When a glass sheet has arrived in the bending station, its forward progress is stopped by a locator frame 35 resting on hearth block 25. The locator frame defines at least one open-ended "pocket" within which the forward portion of a glass sheet may be received. Each of the glass sheet receiving pockets is contoured to correspond approximately to the outline of the leading portion of each glass sheet so that the glass sheet, when urged into engagement with the locator frame, will become seated firmly within the pocket with little or no freedom of movement. The locator frame 35 is spaced from aligning roll 33 a precisely determined distance so that the trailing edge of a properly aligned glass sheet is approximately directly over the center of the aligning roll 33 as shown in FIG. 3. The aligning roll 33 continues rotating so as to urge the glass sheet into the pocket of the aligning frame as the glass sheet floats on the layer of hot gases. The frictional force between the aligning roll 33 and the glass sheet is minimized and restricted to the trailing edge of the glass sheet in order to avoid scuffing the glass, but is sufficient to drive the floating glass sheet into an equilibrium position in alignment with the pocket of the locator frame and to retain the glass sheet therein. Such an aligning arrangement readily lends itself to processing a plurality of glass sheets side by side. It should be apparent that a locator frame could be adapted to accommodate any number of glass sheets which will fit side-by-side on the hearth block 25. The locator frame arrangement itself is the subject matter of co-pending patent application Ser. No. 960,403, filed on Nov. 13, 1978 now U.S. Pat. No. 4,204,853, by S. L. Seymour and entitled "Glass Sheet Alignment Means and Method," the disclosure of which is hereby incorporated by reference.

While the use of a locator frame and an aligning roll as described above is the preferred arrangement for repetitively establishing a precisely predetermined location for each glass sheet as it enters the bending station, other arrangements may serve the same purpose. For example, the use of vertically retractable pins as shown in U.S. Pat. Nos. 3,573,889 and 3,676,098 may be resorted to. It may also be noted that in the event that a roller conveyor were to be used instead of a gas support bed, the need to precisely align the glass sheets within the bending station may be less critical. This is because glass sheets are more prone to drift out of alignment when floating freely on gas support. When a roller conveyor is used to convey the glass sheets into the bending station, final orientation of the glass sheets may be carried upstream from the bending station as shown in U.S. Pat. No. 3,701,643 to R. G. Frank, for example.

Directly overlying the locator frame 35 is platen 40. The platen is comprised of a hollow chamber having a flat bottom plate through which a large number of perforations extend. In order to protect the surface of the hot glass sheets, the underside of the platen may be covered with a protective cover 43, which may be a stretchable knit fiber glass fabric as disclosed in U.S. Pat. No. 3,148,968 to J. H. Cypher et al. The cover 43 may be held in place by a plurality of clamps 44. The hollow interior of the platen may communicate with a source of vacuum and super-atmospheric air by means of a flexible conduit 45. The area of the platen should exceed the total area of the largest glass sheet or sheets to be received at one time in the locator frame 35. For the greatest versatility the platen may cover substantially the entire area of hearth block 25.

The flatness and rigidity of the bottom plate of the platen are important factors for the successful practice of the present invention. Any significant deviation from flatness can result in distortion being imparted to the glass sheets. Thus, the bottom plate should be fabricated with careful attention to providing a flat bottom surface and should be sufficiently rigid to avoid any bending or warping during use. Preferably, the bottom plate is a relatively thick, single piece of heat-resistant metal, such as stainless steel, although in some cases it may be possible to use thinner stock material with reinforcement members welded to the interior surface. As an example of the preferred one-piece construction, a stainless steel thickness of at least one-half inch (13 millimeters), preferably at least ⅝ inch (16 millimeters), has been found suitable for a plate 32 inches by 78 inches (81 centimeters by 2 meters). In that example, the interior of the platen was 3 inches (7.5 centimeters) tall.

The platen is provided with means for vertical reciprocation, such as hydraulic cylinders 50 and guide rods 51, as shown in FIG. 1. The guide rods 51 may slide in fixed, annular sleeves 52. The cylinders 50 reciprocate the platen between a raised position, as shown in FIG. 1, and a lowered position in which the platen is brought closely adjacent to, or in contact with, the locator frame 35 and the glass sheet or sheets held by the locator frame. When the platen is in the lowered position, sufficient vacuum is applied to draw the glass sheets into contact with the platen and to be lifted by the platen as the platen is raised. The platen need not come into contact with the glass sheets in order to pick them up. Merely approaching within 1/32 inch (0.8 millimeter)

to about 1/16 inch (1.6 millimeters) has been found sufficient to lift the glass sheets, although this may vary depending upon the amount of vacuum applied and the weight of the glass. Additionally, the amount of vacuum required, the number of perforations in the platen, and the diameter of the perforations are interdependent. It is desirable to keep the perforations small in number and diameter so as to minimize the power requirement for maintaining a vacuum in the platen, but there should be enough perforations so that a relatively uniform distribution of the perforations will overlie each portion of the smallest piece of glass to be processed. A spacing of about one perforation per square inch (6.5 square centimeters) has been found to be suitable for most purposes. Perforation diameters larger than 0.075 inch (1.9 millimeters), for example about 0.090 inch (2.3 millimeters), have been found satisfactory with a vacuum of 4 inches (10 centimeters) water (gauge). These data pertain to the processing of 3 millimeter thick sheets of soda-lime-silica float glass of standard commercial composition.

With the glass sheet or sheets drawn against its underside by vacuum, the platen 40 is raised to the elevated position as shown in FIG. 1 so as to leave sufficient clearance to insert an outline shaping mold 60 between the hearth block 25 and the platen. The shaping mold conforms to the outline and contour desired for the bent glass sheets and is preferably constructed in accordance with the disclosure of U.S. Pat. No. 3,973,943 to S. L. Seymour, the disclosure of which is hereby incorporated by reference. The shaping mold is preferably of the outline ring type, light in weight and notched along its upper edge in order to provide minimal interference with the flow of air during tempering. The shaping mold is carried on a shuttle 61 by which the shaping mold is translated horizontally through the bending, tempering and unloading zones. In the specific embodiment illustrated, the shuttle consists of a pair of cantilevered beams 62 supported at one end by vertical braces 63, the upper ends of which are adapted to slide along a pair of horizontal guide rods 64. The means for driving the shuttle 61 along the horizontal path may be provided by way of an electric motor (not shown) driving a continuous chain 65 to which the upper ends of braces 63 are affixed. Cross-braces 66 may support the shaping mold or molds on the shuttle.

When the platen 40 has been raised to a height above the elevation of the shaping mold 60, the shuttle is driven to the left as viewed in FIG. 1 so as to bring the bending mold into direct alignment beneath the sheet of glass elevated on the platen. Typically, the distance between the platen and the hearth block 25 at this point may be about 6 to 8 inches (15 to 20 centimeters). This distance will have an effect on the rate at which the glass sheet loses heat, since a higher elevation raises the glass sheet into a cooler environment. This effect may be used to "fine tune" the temperature (and thus the viscosity) at the moment the glass sheet is dropped onto the shaping mold. The uppermost extent of the shaping mold when in position directly beneath the glass sheet is spaced from the glass sheet a distance greater than the minimum required to clear the glass sheet, so that when the glass sheet is released from the platen it will fall a distance onto the shaping mold sufficient to generate a substantial bending force on the glass upon impact. In the typical case where the contour of the shaping mold includes points of maximum elevation, the falling glass sheet first contacts these high points, and a bending moment about these points is generated which forces the remainder of the glass sheet to bend downwardly until substantially complete contact is made with the shaping mold. A suitable distance between the platen and the high points of the shaping mold has been found to be about 1 to 2 inches (2.5 to 5 centimeters), and about 2 to 6 inches (5 to 15 centimeters) at the low points of the mold. The precise distance through which the glass falls will depend upon the weight and temperature of the glass, the degree of curvature to be imparted to the glass, and the geometry of the particular shape, and in unusual cases may vary beyond the distance ranges given above.

Release of the glass sheet from the platen is carried out by reducing the vacuum to an amount insufficient to support the glass sheet. This may be accomplished by opening a valve to bring the interior of the platen into communication with atmospheric pressure. But in the present invention, release of the glass from the platen is accelerated by following a rapid decay of the vacuum with a rapid buildup to a positive pressure as will be set forth more fully below.

The momentum imparted to the glass sheet by its free fall onto the shaping mold preferably provides essentially the sole bending force for conforming the glass sheet to the contour of the shaping mold. Although some minor amount of sagging due to the force of gravity may take place after the glass sheet has come to rest on the shaping mold, its magnitude is insignificant relative to the bending produced by the momentum-generated force in the preferred mode of operation. Sagging is a relatively slow process, and in the present invention, tempering is preferably initiated in the minimum amount of time, thereby providing insufficient time for a significant amount of gravity-induced sagging to take place. On the other hand, for some difficult bends it may be desirable to delay the start of tempering so as to permit a significant amount of additional sagging to take place after the glass sheet has dropped onto the mold. Although slower than the preferred mode, such a technique would be considerably faster than gravity sagging alone since the initial dropping of the glass onto the mold would accomplish a substantial part of the bending very quickly.

Upon receiving the glass sheet, the shaping mold is immediately transferred out of the bending station into the tempering station 12. The tempering station includes upper and lower blast heads 70 and 71 which direct blasts of tempering medium (usually air) onto opposite sides of the glass sheet so as to rapidly cool surface portions of each glass sheet, thereby imparting a temper to the glass sheet. In the type of tempering station shown in FIG. 1, each blast head includes a plurality of pipe modules 72 in fluid communication at their ends with a manifold 73 or 74. Each manifold, in turn, is supplied with pressurized tempering fluid through ducts 75 and 76. Each of the pipe modules 72 has a plurality of small orifices oriented so as to direct jets of tempering fluid toward the position occupied by glass sheets conveyed into the space between the upper and lower blast heads 70 and 71. The pipe modules 72 may be provided with adjustability in the vertical direction with respect to the manifolds 73 and 74 so that more uniform spacing between the glass surfaces and the pipe modules may be provided. The lower blast head 71 may be provided with hinged support 80 at one end and cylinder means 81 at the opposite end so as to permit the lower quench module to be tilted when the need arises to clear glass fragments from the blast head. While blasts of tempering medium are being directed onto the glass sheets in the tempering station, it is preferred to provide relative motion between the blast heads and the glass sheets. This may be carried out by horizontally reciprocating the shuttle means 61 on which the shaping mold and glass sheets are carried.

When tempering has been completed, the shuttle means 61 advances to the full right-hand position as shown in FIG. 1 to bring the glass sheet or sheets into the unloading station 13. There, the glass sheets may be removed from the shaping mold by hand or by suitable mechanical means.

The following operating parameters are an example of a successful operation of the above-described preferred embodiment of the invention with glass sheets 3 millimeters thick. Under different conditions the data will vary. The furnace atmosphere was maintained at a temperature of about 1300° F. (700° C.). The gas issuing from the hearth block 25 in the bending zone may be about 1100° to 1350° F. (600° C. to 725° C.), typically about 1250° F. (675° C.). The platen 40 attained a temperature of about 500° to 750° F. (260° to 400° C.) after a period of operation due to its proximity to the hot gases from hearth block 25. The glass was typically at about 1210° F. (650° C.) when picked up by the platen. A total of about 6 seconds elapsed from the time of glass pick-up until the initiation of tempering, at which time the glass had cooled to about 1190° F. (640° C.). About 3 seconds elapsed from the time the glass was dropped onto the shaping mold until tempering was initiated. Altogether about 10 seconds was required for the glass to pass from the furnace exit, undergo bending, and enter the tempering station. These rapid bending rates not only indicate a high rate of throughput, but are also advantageous for the sake of attaining high degrees of temper since the rapidity of the bending process permits tempering to begin before the glass sheets have lost an appreciable amount of heat.

Figure 2:
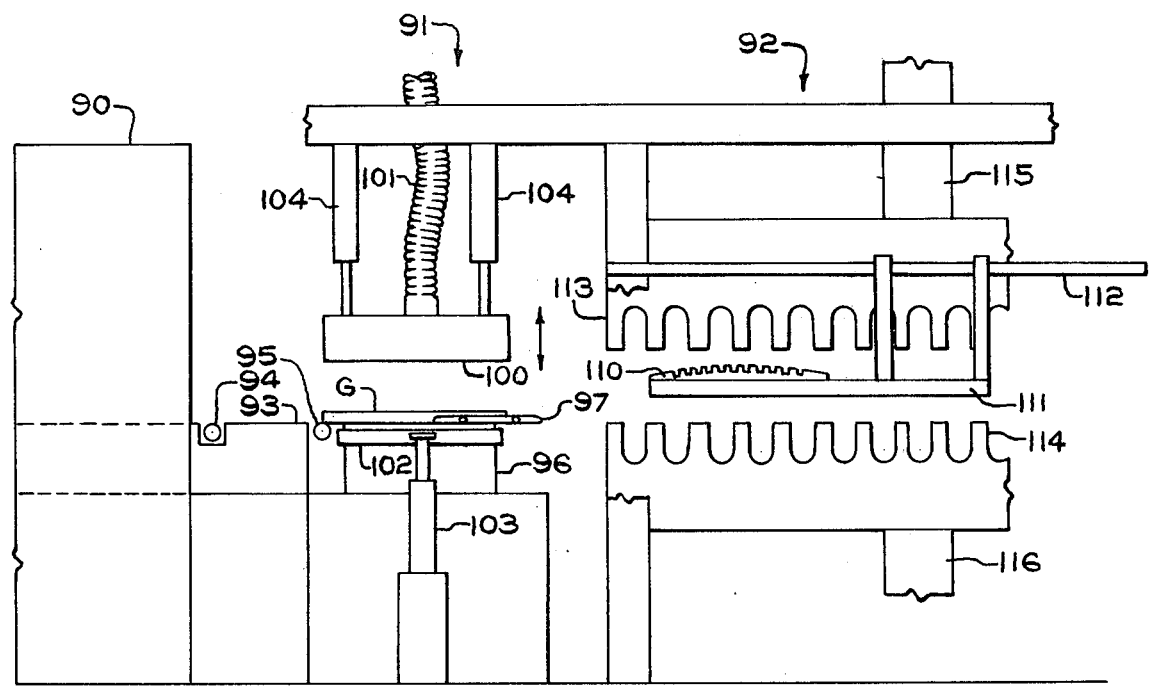
FIG. 2 is an alternate embodiment of a drop forming process for bending glass sheets in which an outline ring may be employed to lift each glass sheet into contact with a reversible pressure platen of the present invention.

FIG. 2 depicts an alternate drop forming arrangement for bending glass sheets which incorporates some but not all of the features and advantages of the preferred embodiment of FIG. 1 and which may employ a reversible pressure platen in accordance with the present invention. FIG. 2 depicts schematically a furnace 90, a bending station 91, and a tempering station 92. As in the FIG. 1 embodiment, glass sheets are supported and conveyed through the furnace and the bending station on gas support means. A gas support hearth block 93 extends from the exit end of the furnace 90 and another hearth block 96 supports the glass sheets within the bending station. A roller 94 accelerates the glass sheets out of the furnace and into the bending station where they may be aligned preferably by means of an aligning roll 95 and a locator frame 97 in the same manner as described above in connection with FIG. 1.

In the bending station 91 in FIG. 2, a flat platen 100 overlies the glass sheet G in the aligned position. The platen in this embodiment need not be vertically reciprocated but may be rigidly suspended. Instead of being picked up by the platen, the glass sheet in this embodiment may be lifted into contact with the underside of the platen by a lifting ring 102. Alternatively, the platen 100 may also vertically reciprocate by means of hydraulic cylinders 104 as shown to cooperate with the lifting ring 102 to raise the glass sheet off of the gas support hearth block. The platen communicates with a source of vacuum and positive pressure through a flexible conduit 101. Lifting ring 102 is vertically reciprocated by means of a hydraulic cylinder 103. The lifting ring 102 may fit around a gas support hearth block 96 as shown or the ring may fit into grooves cut into the top of a larger hearth block. The upper side of the lifting ring defines a flat plane of support for a glass sheet along either a continuous or discontinuous line of contact with marginal edge portions of a glass sheet. After each glass sheet is lifted by the ring 102 and retained by vacuum on the underside of the platen 100, the ring is retracted to its lower position and the platen, if desired, may also be raised to provide clearance for a shaping mold 110 which is conveyed by a carriage 111 riding on rods 112. The shaping mold 110 is brought into alignment beneath the glass sheet retained on the platen and the pressure in the platen is reversed to force the glass sheet onto the shaping mold to impart the desired curvature to the glass sheet. The glass sheet may then be conveyed into the tempering station 92 by means of the carriage 111 where the glass sheet is rapidly cooled by blasts of air directed at its opposite surfaces from upper and lower banks of nozzles 113 and 114, respectively. The tempering nozzles are supplied with air from ducts 115 and 116.

Other variations on the FIG. 1 embodiment which are compatible with the present invention may involve the use of roller conveyors instead of the gas support means for supporting and conveying the glass sheets. A roller conveyor may be used in place of all of the gas support bed sections in the furnace and bending station, or it may be advantageous to substitute a roller conveyor for the gas support bed in the furnace only and to utilize a gas support block, such as 25 in FIG. 1, in the bending station.

FIG. 3 depicts another alternate embodiment wherein a roller conveyor is employed for supporting the glass sheets through the furnace and the bending station. Shown in the figure are the exit end of a furnace 120, a bending station 121, and a portion of a tempering station 122. A roller conveyor 125 extends through the furnace and into the bending station. A locator frame 126, as described above, may be employed to locate the glass sheet G in proper alignment with an overlying flat platen 130. The platen 130 is in alternate communication with a source of vacuum and pressurized air by way of flexible conduit 131. The platen in FIG. 3 is shown adapted for vertical reciprocation by way of hydraulic cylinders 132, but the platen in this embodiment need not be provided with vertical reciprocation but may be rigidly mounted. Lifting of the glass sheet from the roller conveyor is carried out by a lifting frame 133 comprised of a plurality of upwardly extending fingers 135 aligned with spaces between the conveyor rolls, and recesses 134 within which the conveyor rolls may be received. The upper surface of the lifting frame 133 defines a flat plane of support for a glass sheet being lifted. Cylinder means may be provided to vertically raise the lifting frame 33 so as to lift the glass sheet G aligned in the bending station and to bring it into contact with the underside of the platen 130 where it is retained by vacuum. The lifting frame may then be retracted to its lowered position and optionally, the platen may be raised to provide clearance for a shaping ring 140. The shaping ring is conveyed into the bending station on a carriage 141 riding on rods 142. When the shaping ring 140 is aligned beneath the glass sheet retained on the platen, the pressure in the platen is reversed to rapidly force the glass sheet onto the shaping mold so as to bend the glass sheet. The glass sheet is then conveyed into the tempering station 122 where it is rapidly cooled by blasts of air from upper and lower sets of nozzles 143 and 144, respectively. The nozzles are supplied with air by ducts 145 and 146, respectively.

Figure 4:
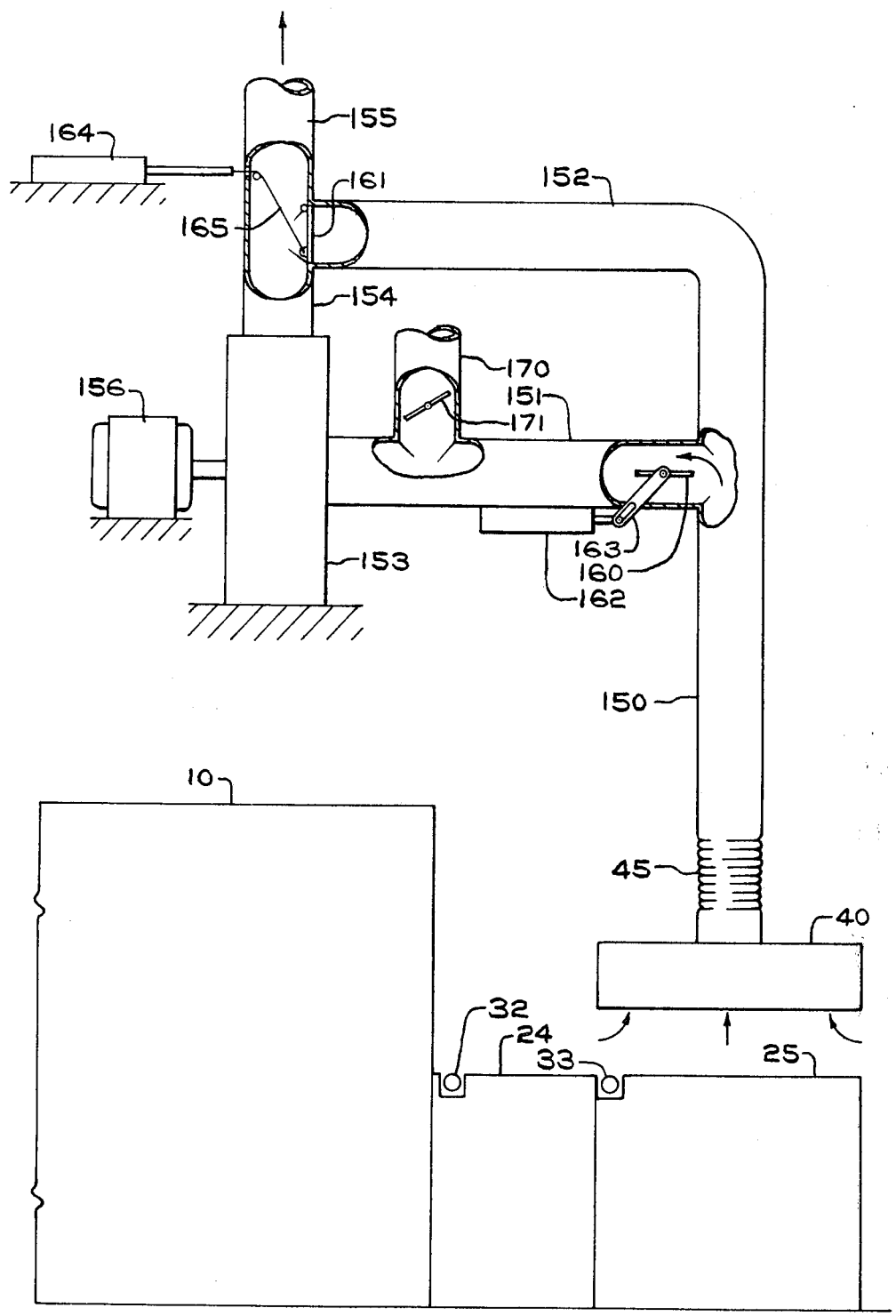
FIG. 4 is a schematic depiction of the ducts and valves for reversibly communicating a blower with a platen of the present invention showing the valves in the vacuum mode for lifting a glass sheet.
Figure 5:
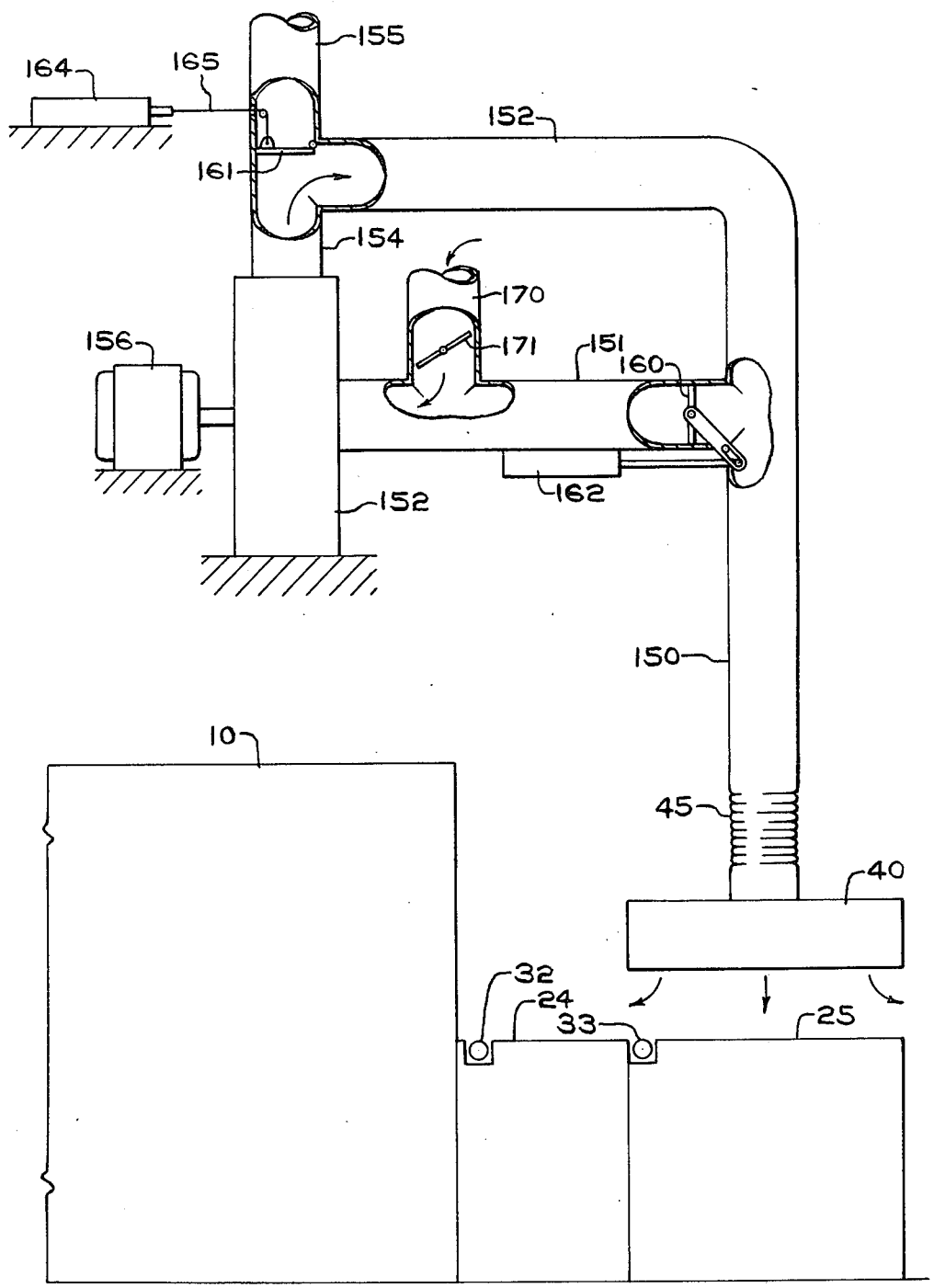
FIG. 5 is likewise a schematic view of the duct system with the valves positioned to direct a positive flow of air to the platen.

FIGS. 4 and 5 depict schematically a suitable arrangement for providing the glass sheet lifting platen with both vacuum and positive pressure. While other arrangements are conceivable, they generally possess significant drawbacks. The use of separate blowers for vacuum and positive pressure is obviously inefficient. Reversing a single blower in a short period of time is impractical due to the inertia of the large blowers required for this type of application. Accordingly, the preferred arrangement is to employ a single, constantly running blower together with a valve arrangement for alternately communicating the suction intake side of the blower or the positive pressure output side of the blower with the platen. In FIGS. 4 and 5, the pressure supply arrangement is disclosed in connection with a schematic representation of the FIG. 1 embodiment for shaping glass sheets in which like numbers refer to like elements. However, it should be understood that the pressure supply arrangement may be applied to any drop forming system such as the embodiments of FIGS. 2 and 3.

In FIG. 4, the pressure supply system is shown providing a vacuum in platen 40. Flexible duct 45 connects the platen with a main supply duct 150 which divides into a negative pressure branch 151 and a positive pressure branch 152. The negative pressure branch 151 leads to the inlet of a blower 153. An outlet duct 154 from the blower communicates selectively with the positive pressure branch 152 or an exhaust duct 155. The blower is powered by a motor 156. An example of a blower found to be suitable for practicing the invention had an output pressure of up to 13 inches (33 centimeters) of water and could pull a vacuum of up to 8 inches (20 centimeters) of water in the platen. A vacuum of about 3 inches (7.6 centimeters) to 8 inches (20 centimeters) of water was usually adequate to lift the glass sheets.

The main duct 150 may be communicated with either the negative pressure branch 151 or the positive pressure branch 152 by means of valves or dampers 160 and 161. Valve 160, shown as a butterfly-type of valve, is located in the negative pressure branch 151 near its junction with the main duct 150. Valve 160 may be remotely actuated by means of a cylinder 162 acting upon a lever arm 163. The other valve 161 may be a two-way flow diverter gate adapted to direct the output flow from the blower to either the exhaust duct 155 or the positive pressure branch 152. Valve 161 may be remotely controlled by way of a cylinder 164 which is connected to the valve by way of a cable 165. An air intake duct 170 having a flow control damper 171 may communicate with negative pressure branch 151 between the valve 160 and the inlet to the blower. The duct 170 serves as a source of incoming air when positive pressure is being supplied to the platen, and the damper 171 permits modulation of the pressure during either the positive or negative pressure modes of operation. The damper 171 may also be remotely controlled, particularly, if it is desired to change its setting when changing from negative to positive pressure. In the negative pressure mode as shown in FIG. 4, valve 160 is open, permitting the intake of the blower to draw air from the platen through the main duct 150. The valve 161 closes the positive pressure branch 152 and diverts the output flow from the blower to the exhaust duct 155. At this time, the platen may engage and lift a sheet of glass from the hearth block 25.

When it is desired to release a glass sheet from the platen, suitable control means may actuate cylinders 162 and 164 so as to quickly change the valve settings to the positive pressure mode as shown in FIG. 5. There, valve 160 closes the negative pressure branch 151, and valve 161 closes the exhaust duct 155. All of the input air to the blower is drawn through duct 170 and the output from the blower is diverted to the positive pressure branch 152 through main duct 150 and to the platen. The positive pressure mode may be maintained for only a brief moment in order to accelerate the fall of a glass sheet from the platen or, if desired, may be maintained for several seconds if cooling of the platen is desired. In any event, before the next glass sheet is ready to be engaged by the platen, the control means will have returned the valves to their vacuum mode positions shown in FIG. 4.

Descriptions of specific embodiments have been set forth herein for the sake of illustrating the best mode and other illustrative examples for practicing applicant's invention, but it should be understood that other variations and modifications as are known to those of skill in the art may be resorted to without departing from the spirit and scope of the invention as set forth in the claims which follows.

I claim:

1. A method of shaping glass sheets, comprising the steps of:

heating a glass sheet to approximately its softening point within a heating chamber;

withdrawing the heat-softened glass sheet from the heating chamber and supporting it in an essentially horizontal orientation on support means;

bringing the upper surface of the glass sheet into close proximity to a flat platen in communication with a source of vacuum;

drawing a vacuum through the platen so as to retain the glass sheet on the platen;

vertically separating the platen and the glass sheet carried thereon from the support means;

bringing into vertical alignment with and beneath the glass sheet held on the platen a shaping mold having a contour defining the desired contour for the glass sheet, and bringing the shaping mold to rest a substantial distance below the glass sheet so as to establish a sufficient dropping distance to shape the glass sheet upon impact with the shaping mold; and rapidly replacing the vacuum in the platen with positive pressure so as to propel the glass sheet from the platen toward the shaping mold with an acceleration greater than the acceleration of gravity, and impacting the shaping mold with the glass sheet with sufficient force to immediately bend the glass sheet to substantially its final shape upon impact with the shaping mold, whereby the glass sheet is shaped in accordance with the contour of the shaping mold.

2. The method of claim 1 wherein the drawing of vacuum in the platen is carried out through a duct communicating with the inlet of a blower, and the provision of super-atmospheric pressure in the platen is carried out through a duct communicating with the outlet of the blower.

3. The method of claim 1 wherein a plurality of glass sheets are simultaneously retained on the platen and are propelled therefrom to fall onto a corresponding plurality of shaping molds.

4. The method of claim 1 wherein the force of impact between the glass sheet and the shaping mold constitutes a substantial portion of the bending force required to shape the glass sheet, and thereafter retaining the glass sheet on the shaping mold to permit additional bending of the glass sheet to take place by sagging under the influence of gravity.

5. The method of claim 4 wherein the height above the shaping mold from which the glass sheet is released is at least 5 centimeters in at least portions of the glass sheet.

6. The method of claim 1 wherein, after the glass sheet has fallen onto the shaping mold, the shaping mold carries the glass sheet out from under the platen into a tempering station where the glass sheet is rapidly cooled by blasts of tempering fluid so as to temper the glass.

7. The method of claim 6 wherein the shaping mold onto which the glass sheet is dropped is a ring conforming to the outline of the glass sheet.

* * * * *